(No Model.)  2 Sheets—Sheet 1.
R. N. CHAMBERLAIN.
ELECTRIC LIGHTING SYSTEM.
No. 539,019.  Patented May 7, 1895.
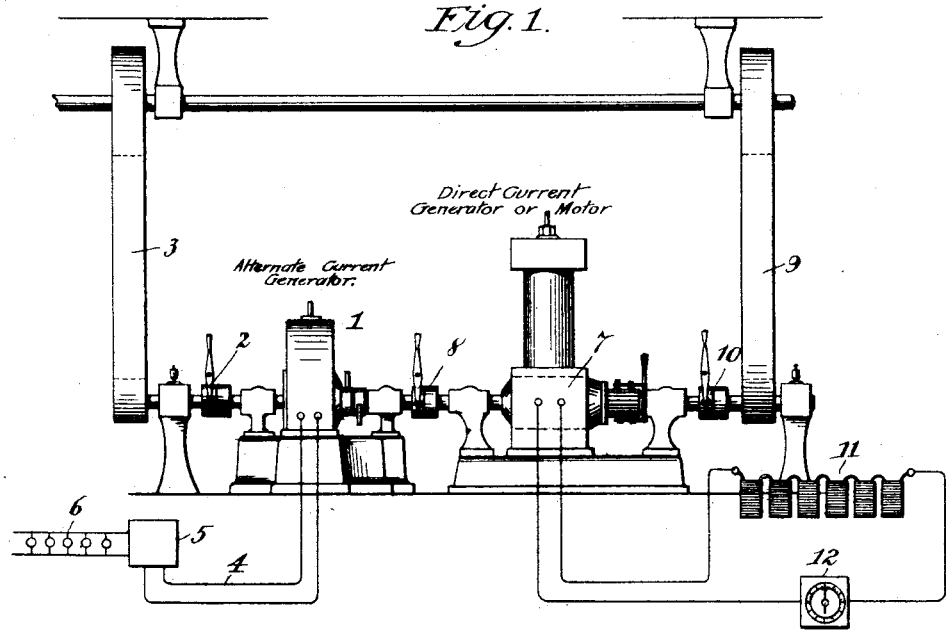
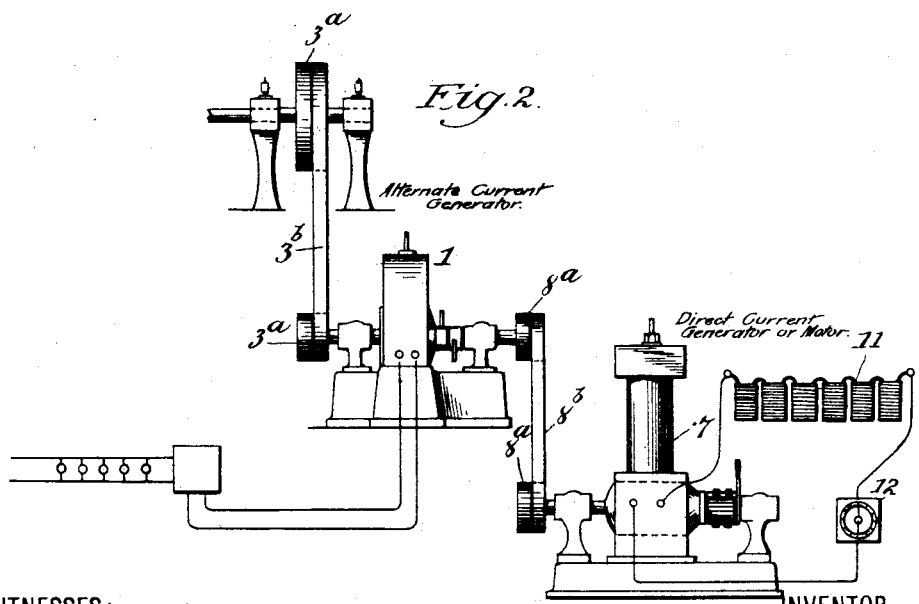

(No Model.) 2 Sheets—Sheet 2.
R. N. CHAMBERLAIN.
ELECTRIC LIGHTING SYSTEM.
No. 539,019. Patented May 7, 1895.
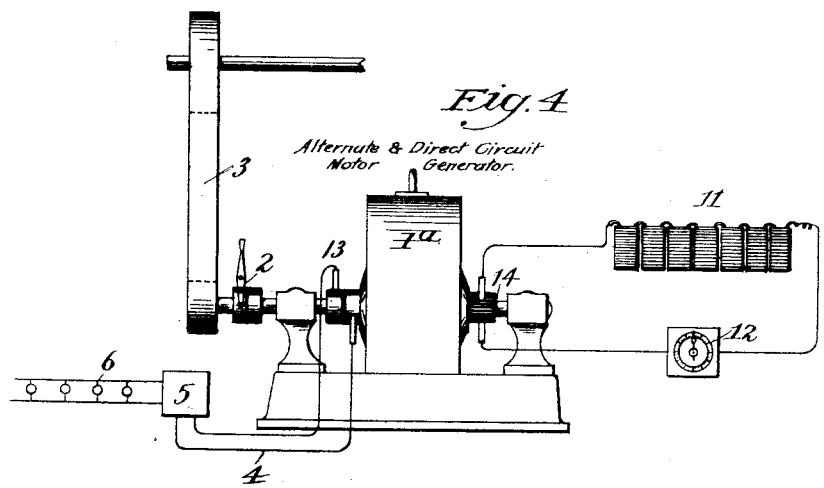
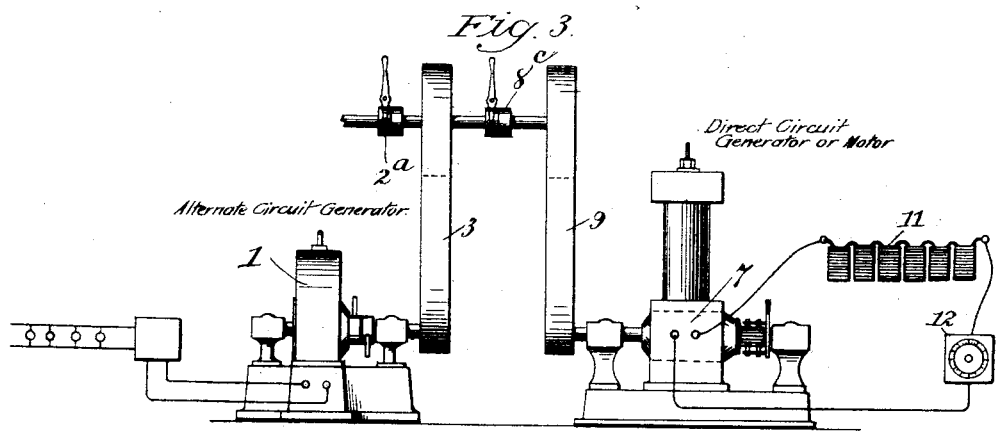
WITNESSES:
Edward N. Rowland
M. V. Bridgood
INVENTOR
Rufus N. Chamberlain
BY
ATTORNEYS
THE NORRIS PETERS CO., PHOTO-LITHO., WASHINGTON, D. C.

UNITED STATES PATENT OFFICE.

RUFUS N. CHAMBERLAIN, OF NEW YORK, N. Y.

ELECTRIC-LIGHTING SYSTEM.

SPECIFICATION forming part of Letters Patent No. 539,019, dated May 7, 1895.

Application filed October 22, 1894. Serial No. 526,605. (No model.)

*To all whom it may concern:*

Be it known that I, RUFUS N. CHAMBERLAIN, a citizen of the United States, residing in the city, county, and State of New York, have invented certain new and useful Improvements in Electric-Lighting Systems, of which the following is a specification.

My improvements are especially intended for those suburban or other comparatively small lighting installations in which the load is insufficient during a part of the day to make it worth while to operate the dynamos by the use of the ordinary power. Such installations generally use the alternating system and it has heretofore been thought impossible or impracticable to use, with such a system, secondary batteries as storage reservoirs which might be drawn upon for supplying the current to the line for use when the load has diminished, for example, during the day-time.

The object of my invention is to make it possible to use, with such an installation, storage batteries which are to be charged while the lights are being operated from the main source of power and in turn, to be used for operating the lights when the main source of power is cut off therefrom.

To this end, my invention consists in certain combinations of apparatus which I will first fully describe with reference to the accompanying drawings and then point out in the claim the novel parts and combinations.

In the drawings, Figure I is a view, partly in elevation and partly in diagram, showing my system applied to a plant having a direct-coupled alternating-current and direct-current generator. Fig. II shows in elevation a different arrangement of such generators. Fig. III shows still another method of arranging the alternating and direct current machines. Fig. IV is an elevation in diagram showing the employment of a motor-generator.

Referring to Fig. I, 1 is an alternating current generator having a clutch 2 by means of which it may be connected to, or disconnected from, power driving mechanism 3 operated from any suitable source of power. I have here shown belt and pulleys. The generator 1 supplies alternating current to the main line 4 in which one or more transformers 5 supply reduced current to local lamp circuits 6.

7 is a direct current electric machine which may, by means of clutch 8, be directly coupled with the shaft of generator 1 and receive motion therefrom, or, it may be driven by belt and pulleys 9 from the same counter-shaft which drives the generator 1. In the latter case, a clutch 10 may be employed to disconnect the electric machine 7 from the driving mechanism. The electric machine 7 when driven either by the shaft of generator 1 or from the driving mechanism or by both of these mechanisms together as shown in Fig. I supplies direct current to storage batteries 11 in the circuit of which is placed a current regulator 12.

In operating my system, the alternating current generator 1 is driven during the time of normal and maximum or full load so as to supply alternating current to the translating circuit 4, 5, 6 and at the same time and from the same source of power, the direct current machine 7 is operated so as to charge the storage batteries 11. When the load has decreased so as to make it no longer profitable to run the alternating current generator from the prime source of power, the clutches 2 and 10 are disconnected and current from the storage batteries 11 under regulation by regulator 12 is supplied to the direct current machine 7 which is thereby driven as a motor operating the machine 1 as a generator as before and so supplying alternating current to the translating circuit 4, 5, 6. The direct current machine 7 is then operated alternately as a generator and motor. Instead of using the regulator 12 for proportioning the strength of electric machine 7 to the current demanded, it is apparent that the regulation can be effected by commutating the fields of the electric machine 7.

In Fig. II, I have shown a slightly different arrangement in which fast and loose pulleys $8^a$ and belt $8^b$ are substituted for the clutch 8 of Fig. I and fast and loose pulleys $3^a$ and belt $3^b$ are substituted for friction clutch 2.

Fig. III shows another simple arrangement of the direct coupled form of machine shown in Fig. I which will be readily understood as the light parts are numbered as in Fig. I. The same counter-shaft drives two belts 3 and 9 as before which drive two entirely distinct shafts of the two electrical machines 1 and 7. The friction clutch $2^a$ is used for coupling the power driving mechanism 3 of dynamo 1 to the driving shaft and a friction clutch 8ᶜ is employed for connecting or disconnecting the driving mechanism 9 of the electrical machine 7.

In Fig. IV, a motor generator 1ᵃ is substituted for the two electrical machines 1 and 7. The motor generator has on one side an alternate current generator supplying alternating current by ring commutators 13 to the translating circuit 4, 5, 6 and on the other side a direct current electrical machine alternately supplying current by the segmental commutator 14 to the storage batteries 11 and receiving current from such storage batteries for the purpose of driving the motor generator in the manner which will be readily understood.

Having thus described my invention, the following is what I claim as new therein and desire to secure by Letters Patent:

In an electric lighting system, the combination of a source of mechanical power, an alternating current generator, a direct current generator, a translating circuit connected to said alternating current generator, storage batteries connected with said direct current generator means of disconnecting the alternate current generator from the source of mechanical power and means for mechanically connecting the direct current machine as a motor to said alternating current generator, substantially as and for the purposes set forth.

R. N. CHAMBERLAIN.

Witnesses:
HARRY E. KNIGHT,
M. V. BIDGOOD.